Jan. 18, 1944. C. R. NALLE 2,339,577
CASTER
Filed May 18, 1942
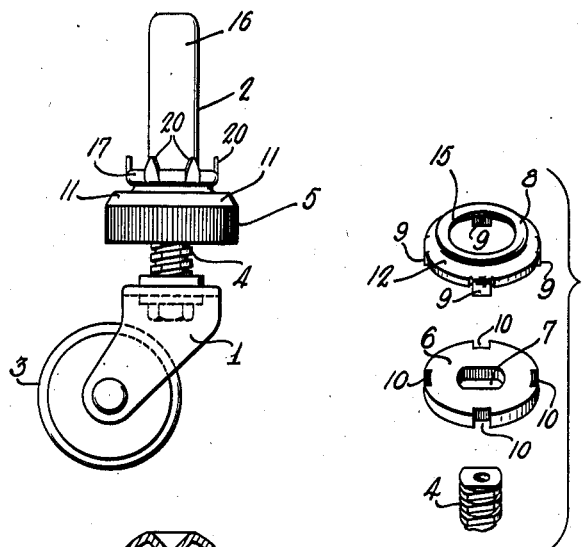
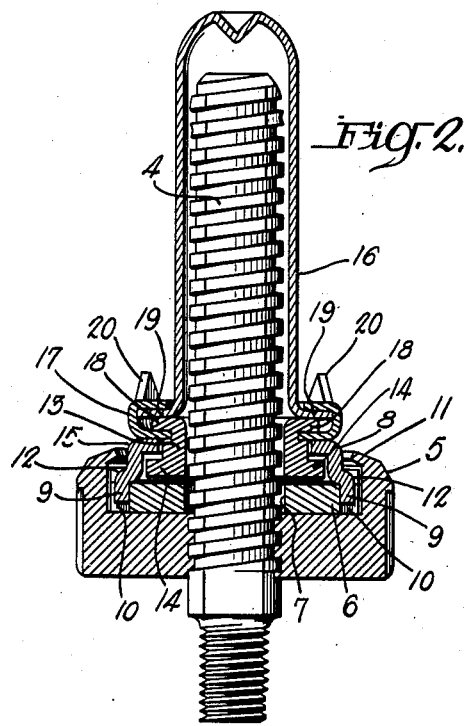
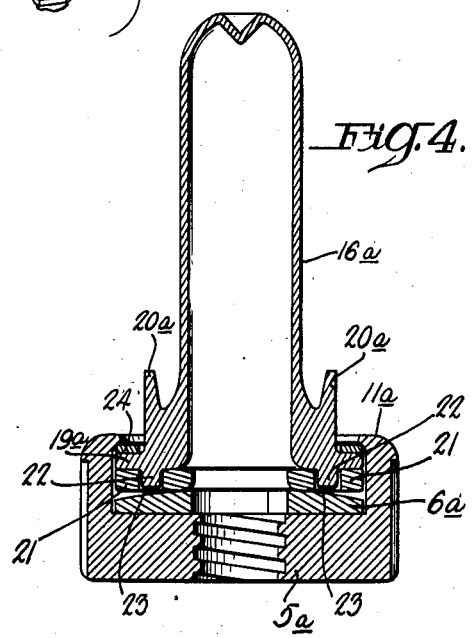
Inventor:-
Charles R. Nalle
by his Attorneys
Howson & Howson Patented Jan. 18, 1944

2,339,577

UNITED STATES PATENT OFFICE 2,339,577

CASTER

Charles R. Nalle, Philadelphia, Pa.

Application May 18, 1942, Serial No. 443,513

7 Claims. (Cl. 16—19)

This invention relates to adjustable casters, and, more particularly, to that type of caster having provision for preventing undesired change of adjustment when the supported object is moved about.

The principal object of the invention is to provide an improved caster of this type which is simple in construction and, therefore, capable of easy and economic manufacture, and which is highly efficient in operation.

A further object of the invention is to provide a caster construction of this general type in which the elements of the socket part are securely held together in a unitary structure, but are permitted ample freedom of relative movement.

Other objects and features of the invention will be apparent as the description proceeds. The invention may be clearly understood by reference to the accompanying drawing illustrating certain preferred embodiments thereof and in which:

Fig. 1 is an elevational view of a caster constructed according to the invention;

Fig. 2 is a sectional view, on a larger scale, of the socket part and the caster shank;

Fig. 3 is an exploded perspective view of certain cooperative parts; and

Fig. 4 is a sectional view of a modified form of the socket part.

Referring more specifically to the drawing, in Fig. 1 there is shown a caster comprising a ground-engaging part 1 and a socket part 2. In the specific illustration, the part 1 carries a roller or wheel 3, but it will be understood that the invention is not limited to this particular form of caster but is applicable as well to the well-knowing glide type. The part 1 also includes an upstanding threaded shank 4 having a non-circular peripheral contour. In the specific illustration, the shank has its threads flattened on opposite sides, as shown more clearly in Figs. 2 and 3.

The present invention is directed particularly to a novel construction of the socket part 2 in combination with the non-circular threaded shank. As shown more clearly in Fig. 2, the socket part comprises a weight-supporting nut 5 having a central threaded opening adapting it for threaded engagement with the shank 4. Hence, relative rotation of the nut and the shank causes vertical movement of one of these elements with respect to the other. The nut 5 is cup-shaped, as illustrated. Within the cup-shaped nut and immediately above the main portion thereof is a plate 6 which is adapted to slide along the shank 4. As shown in Fig. 3, the plate 6 has a central opening 7 which is complemental to the non-circular contour of the shank 4, thus preventing relative rotation of the plate and the shank. A ring 8 is shaped and disposed as illustrated in Fig. 2 and has depending lugs 9 (Fig. 3) seating in recesses 10 in plate 6, thus interlocking the ring 8 with the plate. An inwardly extending flange 11 at the top of nut 5 extends over the shoulder 12 of ring 8, thus loosely coupling the ring to the nut.

A collar 13 is disposed above plate 6 and has a lower flange 14 cooperating with an inwardly extending flange 15 on ring 8 to loosely couple the collar to the ring. The upper portion of the collar 13 is securely fastened to a tubular housing member 16 by a ring 17 which embraces and snugly engages the abutting flanges 18 and 19 on collar 13 and member 16, as shown in Fig. 2. Thus, elements 13, 16 and 17 are securely fastened together. The ring 17 has teeth 20 extending upwardly therefrom which are adapted to engage the object to be supported, such as the leg of an article of furniture.

The flange 18 on collar 13 and the turned tabs of ring 17 between teeth 20 are turned or bent during assembly. The method of assembly is as follows: The ring 8 is placed over collar 13 and ring 17 is then put in place. Flange 18 is then formed and housing member 16 is placed above it. The tabs of ring 17 between teeth 20 are then turned over.

Thus, it will be seen that all of the elements of the socket part 2 are secured together in a unitary structure. Further, it will be noted that the ring 8 is enabled to rotate relative to the parts 13, 16 and 17 which are rigidly secured together. The importance of this will be seen presently. The elements of the socket structure shown in Figs. 1 to 3 are such that they may be formed by simple and conventional operations.

Considering the operation of the above-described device, it may be assumed that the socket part is secured to the leg of an article of furniture or the like in the usual manner, with the teeth 20 biting into the end of the said leg. Hence, the elements 13, 16 and 17 remain stationary. The caster is adjusted by rotating the nut 5, thus bringing the roller or wheel 3 into firm engagement with the floor. During this rotation of the nut, the elements 6 and 8 remain stationary.

Assume now that the article of furniture, or other supported object, is moved about, causing the part 1 to swivel and causing rotation of the shank 4. The plate 6 rotates with the shank, and, by reason of its frictional engagement with the nut 5, it carries the nut with it so that the adjustment of the caster is not disturbed. The loose coupling between ring 8 and collar 13 permits this rotation of ring 8, plate 6 and nut 5 relative to the other parts. It will be noted that there is only one point of bearing in the device, i. e., between rings 8 and 17, but the bearing surface or area is small and presents little resistance to swiveling.

In Fig. 4, there is illustrated an alternative form of the socket assembly in which the number of parts is reduced. In this instance, the nut 5a and the plate 6a correspond to the corresponding elements of the first embodiment. The housing member 16a is formed as a die casting and is provided at its lower portion with integral teeth 20a. Washer 21, formed of very hard material, such as steel, is disposed above plate 6a and is interlocked with the housing member 16a by means of projections 22 and apertures 23 provided in these elements. The purpose of the washer 21 is to provide a bearing element to take the wear when the plate 6a rotates relative to the housing member 16a. It will be noted that the upper surface of plate 6a is rounded so as to minimize the engaging surface between the plate and the washer 21.

The flange 11a at the upper part of the cup-shaped nut 5a loosely couples the parts together. A hard washer 24, which may also be formed of steel, is provided between the flanges 11a and 19a and serves to protect the die-cast housing member from excessive wear.

This form of the caster operates substantially in the same manner as the first embodiment. When the supported object is moved about, causing rotation of the shank, the plate 6a rotates with the shank and carries nut 5a with it by virtue of the frictional engagement between these elements. Hence, any change of adjustment of the caster is effectively prevented.

In this form of the device, there are two points of bearing, i. e., between elements 6a and 21, and between elements 11a and 24. However, the bearing surfaces are reduced to a minimum and present little resistance to swiveling.

In both forms of the device, the threads at the top of the shank may be burred during assembly and after the nut is placed thereon, to prevent the parts 1 and 2 from being taken apart.

The device has numerous advantages some of which are the following.

The overall diameter of the nut may be small, e. g., about one inch, thus adapting the device for articles of furniture having small diameter legs.

The construction provides an inconspicuous and pleasing appearance, with no unsightly parts. Moreover, it will not catch and accumulate parts of dusting cloths, broom straws or mop strings.

Its swiveling action is free at either extreme position of adjustment and throughout its adjustment range, as there is nothing to cause the parts to lock or jam.

There is no objectionable play or lost motion between the parts.

The range of adjustment is limited only by the length of the threaded shank.

The device is fully protected from borings left in the hole in the furniture leg, which cannot get into the interior and jam the parts.

Since the shank cannot contact the furniture leg at any time, there is no possibility of interference with the swiveling action nor prevention of full adjustment.

Although only two specific embodiments of the device have been illustrated and described, it will be apparent that the invention is not thus limited, but is capable of further embodiments and modifications.

I claim:

1. In an adjustable caster, an upstanding threaded shank of non-circular peripheral contour, a cup-shaped weight-supporting nut threadedly engaging said shank and adjustably carried thereby, a plate slidably disposed on said shank within the cup-shaped nut, said plate having an opening complemental to the contour of the shank to prevent relative rotation of the plate and the shank, a tubular housing member for said shank above said plate, means associated with said housing member for engaging a supported object, and means including a flange on said nut for securing the nut, said plate and said housing member together while permitting relative rotation thereof.

2. In an adjustable caster, an upstanding threaded shank of non-circular peripheral contour, a cup-shaped weight-supporting nut threadedly engaging said shank and adjustably carried thereby, a plate slidably disposed on said shank within the cup-shaped nut, said plate having an opening complemental to the contour of the shank to prevent relative rotation of the plate and the shank, a tubular housing member for said shank above said plate, said housing member being closed at its upper end, means associated with said housing member for engaging a supported object, and means including a flange on said nut for securing the nut, said plate and said housing member together while permitting relative rotation thereof.

3. In an adjustable caster, an upstanding threaded shank of non-circular peripheral contour, a weight-supporting nut threadedly engaging said shank and adjustably carried thereby, a plate slidably disposed on said shank above said nut, said plate having an opening complemental to the contour of the shank to prevent relative rotation of the plate and the shank, a ring interlocked with said plate, a flange on said nut loosely coupling said ring to the nut, a tubular housing member for said shank above the aforesaid elements, and means loosely coupling said housing member to said ring, whereby said nut, said plate and said housing member are secured together but are permitted to rotate relative to one another.

4. In an adjustable caster, an upstanding threaded shank of non-circular peripheral contour, a weight-supporting nut threadedly engaging said shank and adjustably carried thereby, a plate slidably disposed on said shank above said nut, said plate having an opening complemental to the contour of the shank to prevent relative rotation of the plate and the shank, a flanged ring interlocked with said plate, a flange on said nut loosely embracing said ring, a tubular housing member for said shank above said ring, said housing member having a flange on its lower end, and means loosely coupling the flanges of said ring and said housing member together.

5. In an adjustable caster, an upstanding threaded shank of non-circular peripheral contour, a cup-shaped weight-supporting nut threadedly engaging said shank and adjustably carried thereby, a plate slidably disposed on said shank within said nut, said plate having an opening complemental to the contour of the shank to prevent relative rotation of the plate and the shank, a tubular housing member for the shank above said plate, said member having integral teeth for engaging a supported object and also having an integral flange, and a flange on said nut cooperating with the flange on said housing member to secure the aforesaid elements together while permitting relative rotation thereof.

6. In an adjustable caster, an upstanding threaded shank of non-circular peripheral contour, a cup-shaped weight-supporting nut threadedly engaging said shank and adjustably carried thereby, a plate slidably disposed on said shank within said nut, said plate having an opening complemental to the contour of the shank to prevent relative rotation of the plate and the shank, a tubular housing member for the shank above said plate, said member having integral teeth for engaging a supported object and also having an integral flange, a bearing element interposed between said plate and said housing member, a flange on said nut cooperating with the flange on said housing member to secure the aforesaid elements together while permitting relative rotaiton thereof, and a second bearing element interposed between said flanges.

7. In an adjustable caster, an upstanding threaded shank of non-circular peripheral contour, weight-supporting means, including a cup-shaped element, threadedly engaging said shank and adjustably carried thereby, a plate slidably disposed on said shank within said cup-shaped element, said plate having an opening complemental to the contour of the shank to prevent relative rotation of the plate and the shank, a tubular housing member for said shank above said plate, means associated with said housing member for engaging a supported object, and means on said cup-shaped element for securing the weight-supporting means, said plate and said housing member together while permitting relative rotation thereof.

CHARLES R. NALLE.